United States Patent [19]
Alexander

[11] 3,799,024
[45] Mar. 26, 1974

[54] BAND SAW

[75] Inventor: Carl J. Alexander, Moorepark, Mich.

[73] Assignee: Wells Manufacturing Corporation, Three Rivers, Mich.

[22] Filed: Nov. 2, 1972

[21] Appl. No.: 303,286

[52] U.S. Cl................. 83/799, 83/465, 83/701, 83/811, 83/812
[51] Int. Cl... B23d 55/02, B27b 13/04, B23d 55/04
[58] Field of Search ............. 83/794, 799, 809, 810, 83/811, 812, 813, 701

[56] References Cited
UNITED STATES PATENTS
| | | | |
|---|---|---|---|
| 2,556,670 | 6/1951 | Ashworth | 83/809 |
| 3,385,330 | 5/1968 | Haynes | 83/779 |
| 3,452,629 | 7/1969 | Jacobson | 83/812 |

*Primary Examiner*—Donald R. Schran
*Attorney, Agent, or Firm*—Gordon W. Hueschen

[57] ABSTRACT

A motor-driven saw having an elongated frame support member with a clamp means clamped to a mounting column which has a hollow, open upper end provided with a longitudinal slit in the side wall of said column. The frame support member is also provided with an upwardly projecting trunnion, and a frame support platform is rotatably mounted thereon. Frame means carrying a band saw blade and a motor arranged to drive the band saw blade is pivotally mounted on the frame support platform. The hollow, open upper end of the mounting column is adapted to receive a work support means which is held in place by the clamp means of said elongated frame support member.

4 Claims, 4 Drawing Figures

BAND SAW

BACKGROUND OF THE INVENTION

This invention relates to band saws.

It is an object of the present invention to provide a band saw having a readily rotatable saw head.

A further object of this invention is to provide a band saw provided with an interchangeable work support means.

Still other objects will readily present themselves to one skilled in the art upon reference to the ensuing specification, and the drawings, and the claims.

SUMMARY OF THE INVENTION

The present invention contemplates a motor-driven saw which comprises a base plate, an upright mounting column, an elongated frame support member mounted on said column, a frame support platform rotatably mounted on said frame support member, frame means pivotally mounted on the frame support platform, a band saw blade rotatably supported on said frame means, and a motor mounted on said frame means and arranged to drive the band saw blade. The cutting portion of the band saw blade is substantially aligned with the rotational axis of the frame support platform.

The upright mounting column has a lower end fixed within a suitable base plate and is provided with an open, hollow upper end having a longitudinal slit in the side wall thereof. The elongated frame support member is provided with an upwardly projecting trunnion and with a clamp means at one end of the support member which attaches the support member to the mounting column. The frame support platform is rotatably mounted on said trunnion for rotation in a substantially horizontal plane and carries the frame means bearing the band saw blade and the motor therefor.

In a preferred embodiment of this invention, an interchangeable work support means such as a vise, table, or the like, is mounted in the hollow upper end of the mounting column. The work support means is provided on the underside thereof with a mounting boss which is received within the hollow upper end and is held in place by the clamp means provided on the elongated frame support member, and which permits rotation of the work support means. The rotary action of the work support means together with the rotation of the frame support platform permits cutting at any angle from 0 to 180°.

DESCRIPTION OF THE PREFERRED EMBODIMENTS

Figure 1:
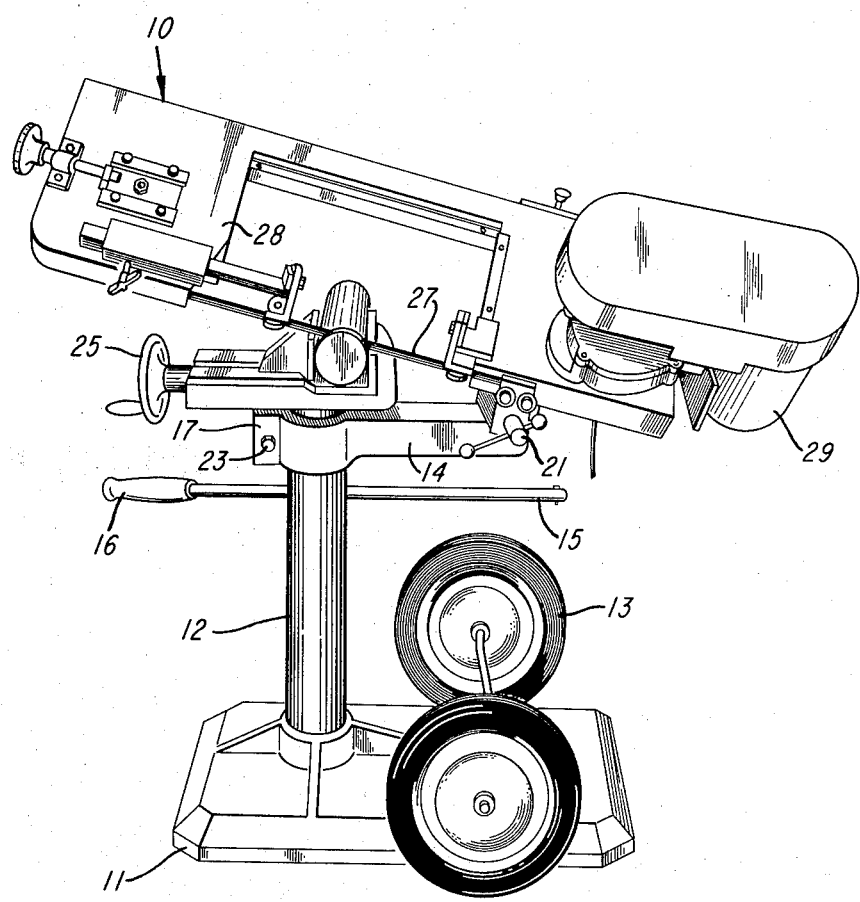
FIG. 1 is a side view of a band saw embodying this invention.

Referring to FIG. 1, saw head 10 is supported on a portable pedestal base which includes base plate 11, upright mounting column 12, and wheel means 13 pivotally mounted on base plate 11 so as to pivot freely in an arc of less than about 360° from a rest position (shown in FIG. 1) to a support position below base plate 11.

The lower end of column 12 is fixed within base plate 11, and elongated frame support member 14 is secured to column 12 near the upper end thereof. An optional handle means such as handle rod 15 equipped with grip 16 passing transversely through column 12 can also be provided, if desired.

Elongated frame support member 14 is provided with clamp 17 integral therewith and situated at one end of support member 14. Clamp 17 surrounds column 12 and slidably attaches elongated support member 14 thereto. Upwardly projecting trunnion 18 (FIGS. 3 and 4) is also provided on frame support member 14 and serves as a mount for frame support platform 19 which receives trunnion 18 in opening 20 and which is rotatably secured to trunnion 18 by means of clamp screw 21 threaded into clamp screw opening 22.

Figure 2:
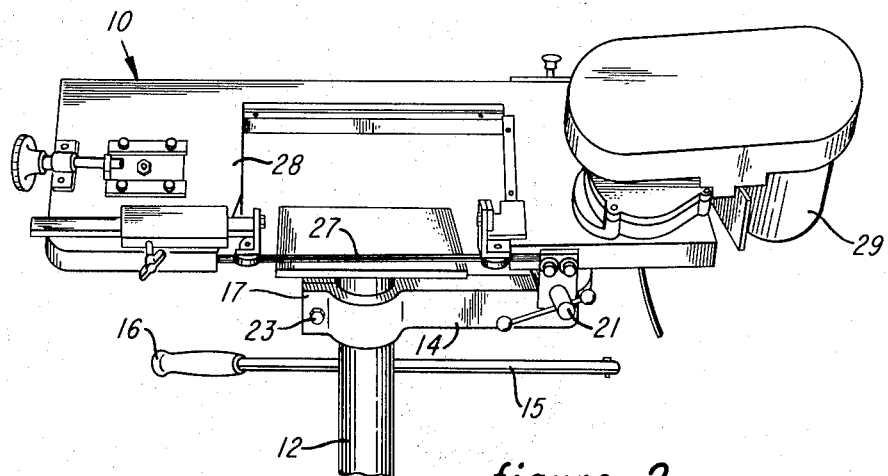
FIG. 2 is a fragmentary side view of a band saw embodying this invention and provided with a work table as the work support means.
Figure 3:
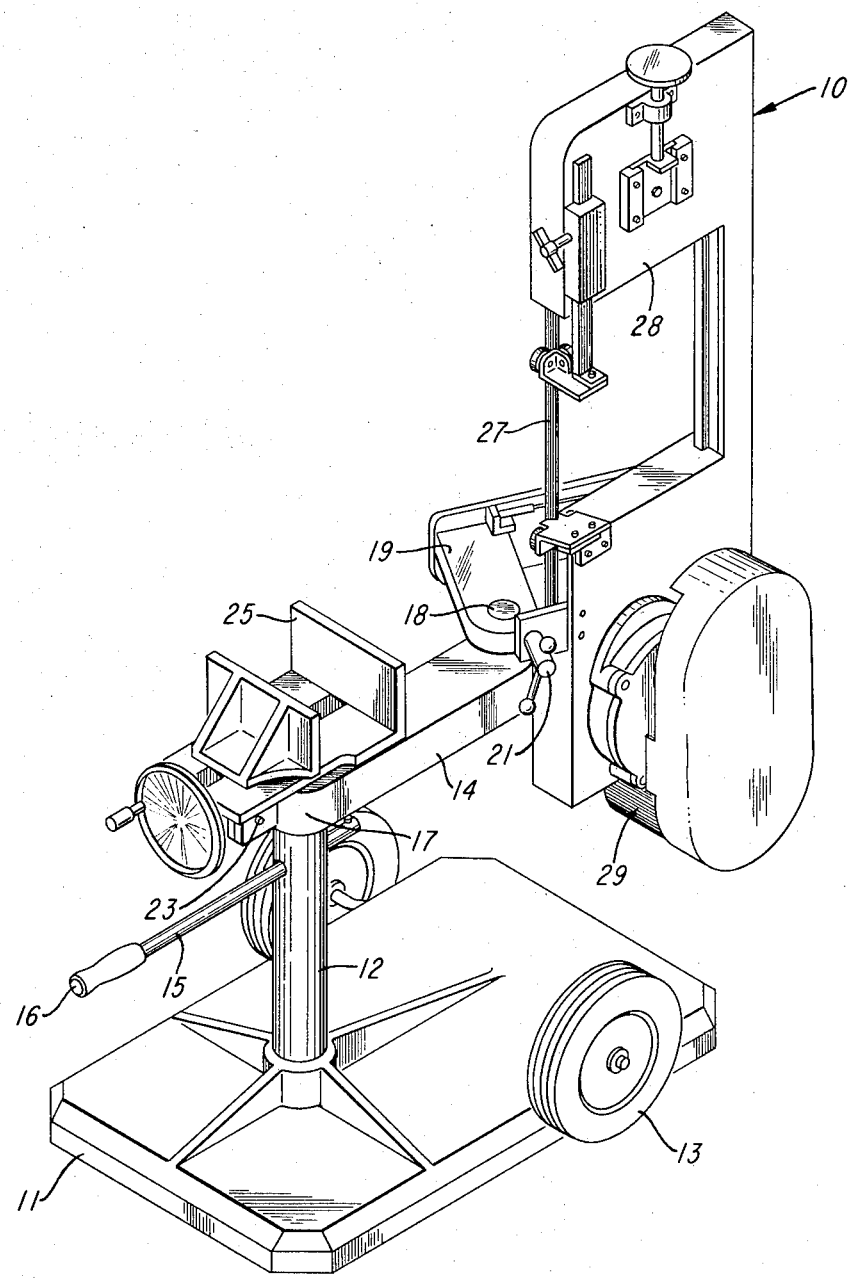
FIG. 3 is a perspective view of a band saw embodying the present invention showing the saw head thereof in a raised position.
Figure 4:
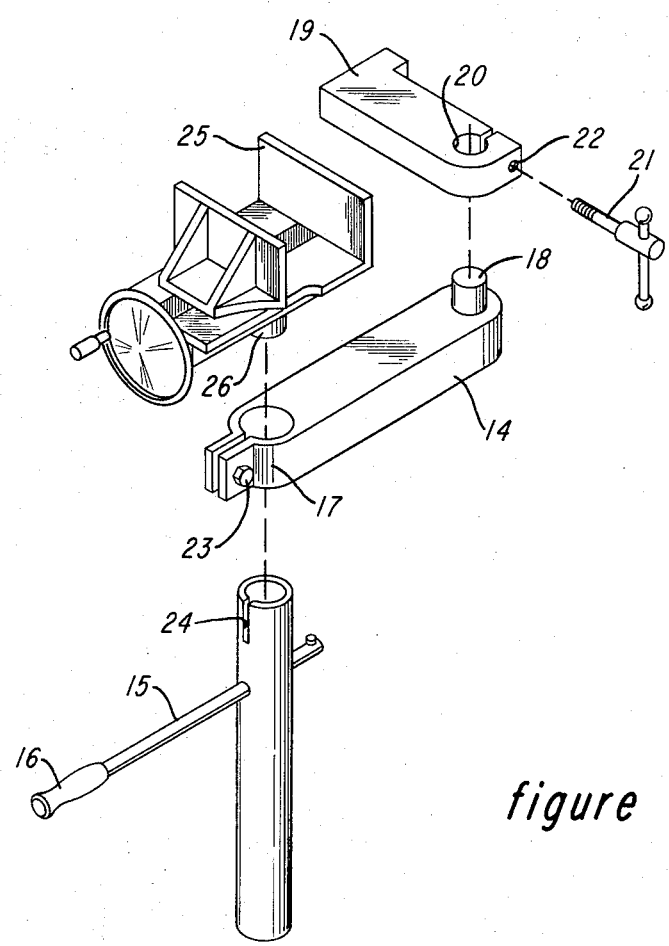
FIG. 4 is a fragmentary exploded view showing the mounting column, the elongated frame support member, the frame support platform, and a work support means of a band saw embodying the present invention.

As shown in FIG. 4, clamp 17 slips over column 12 and is tightened by means of a clamp screw 23. The upper end of column 12 is open and hollow and is provided with longitudinal slit 24 in the column side wall. Mounting boss 26 is situated on the underside of vise 25 and is received within the open, hollow end of column 12. In this manner, as clamp 17 is tightened, vise 25 is also secured to column 12. Such an arrangement permits a ready interchangeability of the work support means utilized in any given instance. Moreover, such an arrangement permits rotation of the work support means which rotation, together with the rotary action of the frame support platform, permits cutting at any angle from 0 to 180° without loosening the work piece from the work support means. For example, vise 25 shown in FIGS. 1, 3 and 4 can be easily replaced as shown in FIG. 2 with work table 30 which is provided with a boss similar to boss 26 for vise 25.

Band saw blade 27 is rotatably supported on frame 28 in conventional manner, e.g., with pulleys over which band saw blade 27 is trained, and is driven by means of motor 29 also mounted on frame 28. Frame 28, in turn, is pivotally mounted on frame support platform 19 for movement in a substantially vertical plane.

Band saw blade 27 must be situated so that the blade line of the cutting portion of blade 27 is substantially aligned with the rotational axis of frame support platform 19. That is, the blade line of blade 27, when extended, must pass substantially over the longitudinal axis of trunnion 18. Mounting of saw blade 27 in the foregoing manner avoids the generation of any side thrust during cutting and obviates any tendency for saw blade 27 to move sideways while a cut is made.

If desired, clamp screw 21 can be utilized as the pivot axis and to lock frame 28 in any desired position, for example, vertically as shown in FIG. 3, in which position saw head 10 is used as a vertical saw for making hand-held cuts such as contour cuts, notching, or the like. For this purpose a vertical utility table can be removably mounted on frame 28 in any convenient manner.

The foregoing discussion and the drawings are intended as illustrative and are not to be taken as limiting. Still other rearrangements of parts and variations within the spirit and scope of this invention are possible and will readily present themselves to the skilled artisan.

I claim:

1. A motor-driven saw which comprises
a base plate;
an upright mounting column having a lower end fixed within said base plate and having an open, hollow upper end provided with a longitudinal slit in the side wall thereof;
an elongated frame support member provided with an upwardly projecting trunnion and with a clamp means at one end of the frame support member, and attached to the hollow end of said mounting column by said clamp means;
a frame support platform rotatably mounted on said trunnion for rotation in a substantially horizontal plane;
frame means pivotally mounted on said frame support platform for movement in a substantially vertical plane;
a band saw blade rotatably supported on said frame means and aligned so that the blade line of the cutting portion thereof is substantially in line with the rotational axis of the frame support platform; and
a motor mounted on said frame means and arranged to drive said band saw blade.

2. The motor-driven saw in accordance with claim 1 wherein a work support means is provided with a mounting boss on the underside of said work support means and wherein said mounting boss is received within said hollow upper end of the mounting column and is held in place by said clamp means.

3. The motor-driven saw in accordance with claim 2 wherein the work support means is a vise.

4. The motor-driven saw in accordance with claim 2 wherein the work support means is a table.

* * * * *